United States Patent
Ding et al.

(10) Patent No.: US 9,571,534 B2
(45) Date of Patent: Feb. 14, 2017

(54) VIRTUAL MEETING VIDEO SHARING

(71) Applicant: Cisco Technology, Inc., San Jose, CA (US)

(72) Inventors: Jianzhong Ding, San Jose, CA (US); Haitao Xin, Cupertino, CA (US); Zheng Yuan, Santa Clara, CA (US); Guangbing Liu, Sunnyvale, CA (US); Hailei Sheng, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 14/090,438

(22) Filed: Nov. 26, 2013

(65) Prior Publication Data
US 2014/0156756 A1    Jun. 5, 2014

Related U.S. Application Data

(63) Continuation of application No. 13/155,536, filed on Jun. 8, 2011, now Pat. No. 8,621,352.

(51) Int. Cl.
G06F 3/00 (2006.01)
G06F 15/177 (2006.01)
(Continued)

(52) U.S. Cl.
CPC .......... H04L 65/403 (2013.01); G06F 3/1454 (2013.01); G06F 3/1462 (2013.01);
(Continued)

(58) Field of Classification Search
CPC ... G11B 27/34; G11B 27/034; H04N 5/44543; H04N 5/4401; H04N 21/4622
(Continued)

(56) References Cited

U.S. PATENT DOCUMENTS

| | | |
|---|---|---|
| 5,471,248 A | 11/1995 | Bhargava et al. |
| 6,040,879 A | 3/2000 | Park |

(Continued)

FOREIGN PATENT DOCUMENTS

| | | |
|---|---|---|
| CN | 101080008 A | 11/2007 |
| JP | 2000-244924 A | 9/2000 |
| WO | 2010114512 A1 | 10/2010 |

OTHER PUBLICATIONS

International Search Report and Written Opinion in counterpart International Application No. PCT/US2012/034014, mailed Nov. 7, 2012.

(Continued)

Primary Examiner — Doon Chow
Assistant Examiner — Shourjo Dasgupta
(74) Attorney, Agent, or Firm — Edell, Shapiro & Finnan, LLC

(57) ABSTRACT

A method is provided in one particular example that includes identifying an attempt by a first communications device to play video data within a virtual meeting session using a first media player. The first communications device can be sharing at least a portion of a desktop presented on the first communications device with one or more other remote communications devices participating in the virtual meeting session. The method can also include identifying a copy of the video data, and launching one or more media players to present at least a portion of the copy of the video data on the one or more other remote communications devices. The one or more media players are launched to correspond to a location of the first media player on the shared portion of the desktop.

20 Claims, 10 Drawing Sheets

(51) Int. Cl.
*H04L 29/06* (2006.01)
*G06F 3/14* (2006.01)
*H04N 7/15* (2006.01)
*H04L 12/18* (2006.01)
*H04L 12/58* (2006.01)

(52) U.S. Cl.
CPC ...... *H04L 12/1827* (2013.01); *H04L 65/1069* (2013.01); *H04L 65/4015* (2013.01); *H04L 65/4023* (2013.01); *H04N 7/157* (2013.01); *H04L 51/18* (2013.01)

(58) Field of Classification Search
USPC .......................................................... 715/719
See application file for complete search history.

(56) References Cited

U.S. PATENT DOCUMENTS

| | | | |
|---|---|---|---|
| 6,691,154 B1 | 2/2004 | Zhu et al. | |
| 6,760,749 B1 | 7/2004 | Dunlap et al. | |
| 7,571,210 B2 | 8/2009 | Swanson et al. | |
| 7,788,398 B2* | 8/2010 | Chapweske | H04N 7/17318 709/203 |
| 7,966,370 B1* | 6/2011 | Pegg | H04N 7/15 707/608 |
| 8,112,490 B2 | 2/2012 | Upton et al. | |
| 2002/0007417 A1* | 1/2002 | Taylor | G06F 3/0613 709/231 |
| 2004/0045040 A1 | 3/2004 | Hayward | |
| 2004/0267778 A1 | 12/2004 | Rudolph et al. | |
| 2006/0069797 A1* | 3/2006 | Abdo | H04L 65/4084 709/231 |
| 2006/0176369 A1 | 8/2006 | Meritt | |
| 2007/0214423 A1 | 9/2007 | Teplov et al. | |
| 2007/0294265 A1 | 12/2007 | Askew et al. | |
| 2008/0126515 A1 | 5/2008 | Chambers et al. | |
| 2008/0133736 A1 | 6/2008 | Wensley et al. | |
| 2010/0064010 A1 | 3/2010 | Alkov et al. | |
| 2010/0232504 A1 | 9/2010 | Feng | |
| 2010/0268762 A1 | 10/2010 | Pahlavan et al. | |
| 2011/0096675 A1* | 4/2011 | Li | H04L 43/10 370/252 |
| 2011/0242277 A1 | 10/2011 | Do et al. | |
| 2011/0268263 A1* | 11/2011 | Jones | H04M 3/563 379/202.01 |
| 2011/0279634 A1 | 11/2011 | Periyannan et al. | |
| 2012/0054640 A1 | 3/2012 | Nancke-Krogh | |
| 2012/0062688 A1 | 3/2012 | Shen et al. | |

OTHER PUBLICATIONS

U.S. Appl. No. 13/039,065, entitled "System and Method for Managing Conversations for a Meeting Session in a Environment," filed Mar. 2, 2011; Inventor: Tak Ming Francis Pang.
U.S. Appl. No. 13/155,1555, entitled "Virtual Event Forensics," filed Jun. 7, 2011; Inventor: Allan Thomson.
U.S. Appl. No. 13/155,250, entitled "Virtual Event Forensics," filed Jun. 7, 2011; Inventor: Zhuang Wang.
"Cisco EnergyWise Technology," Cisco Systems, 2 pages; [Retrived and printed May 3, 2011] http://www.cisco.com/en/US/products/ps10195/index.html.
"Description of Working Group," Energy Management (eman), 3 pages; [Retrieved and printed May 3, 2011] http://datatracker.ietf.org/wg/eman/charter/.
Ravinder Singh Taneja, "The Talking Stick Colloquium," [Retrieved and printed Mar. 2, 2011]; 8 pages; http://www.sikhchic.com/article-detail.php?id=1204&cat=29.
Veverka, Mark "Patently Important," Jun. 19, 2010; © 2011 Dow Jones & Company, Inc.; 3 pages; http://online.barrons.com/article/SB50001424052970203296004575314402596370046.html.
"VLC Media Player," VideoLAN Organization, 2 pages; [Retrieved and printed May 3, 2011] http://www.videolan.org/vlc/.
"VNCast," ViSLAB, Aug. 21, 2009, 5 pages; http://www.vislab.usyd.edu.au/moinwiki/VNCast.
English translation of second Office Action in corresponding Chinese Application No. 20128037560.3, issued May 9, 2016, 12 pages.
First Office Action in counterpart Chinese Application No. 201280005158.7, issued Sep. 6, 2015, 29 pages.

* cited by examiner

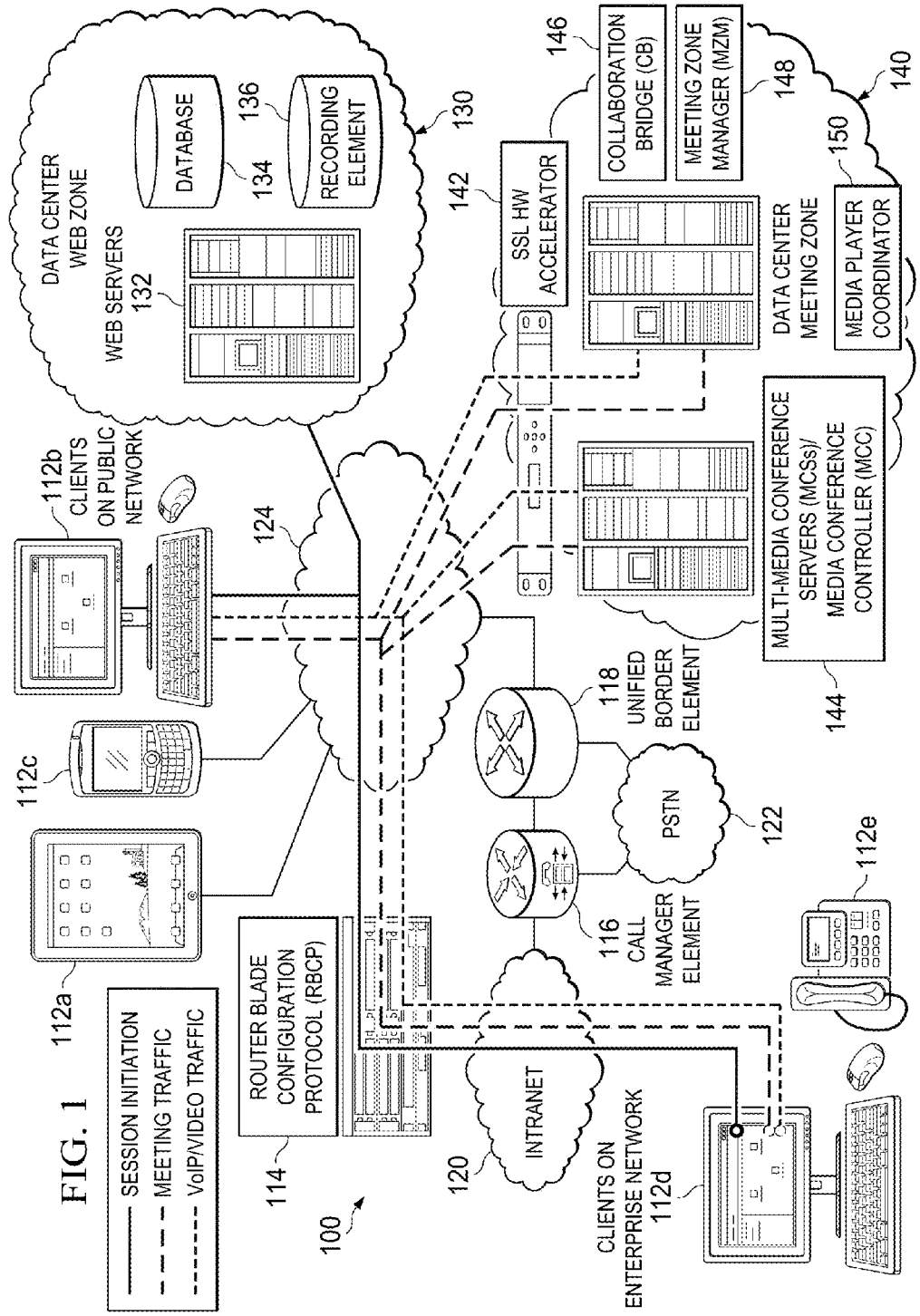

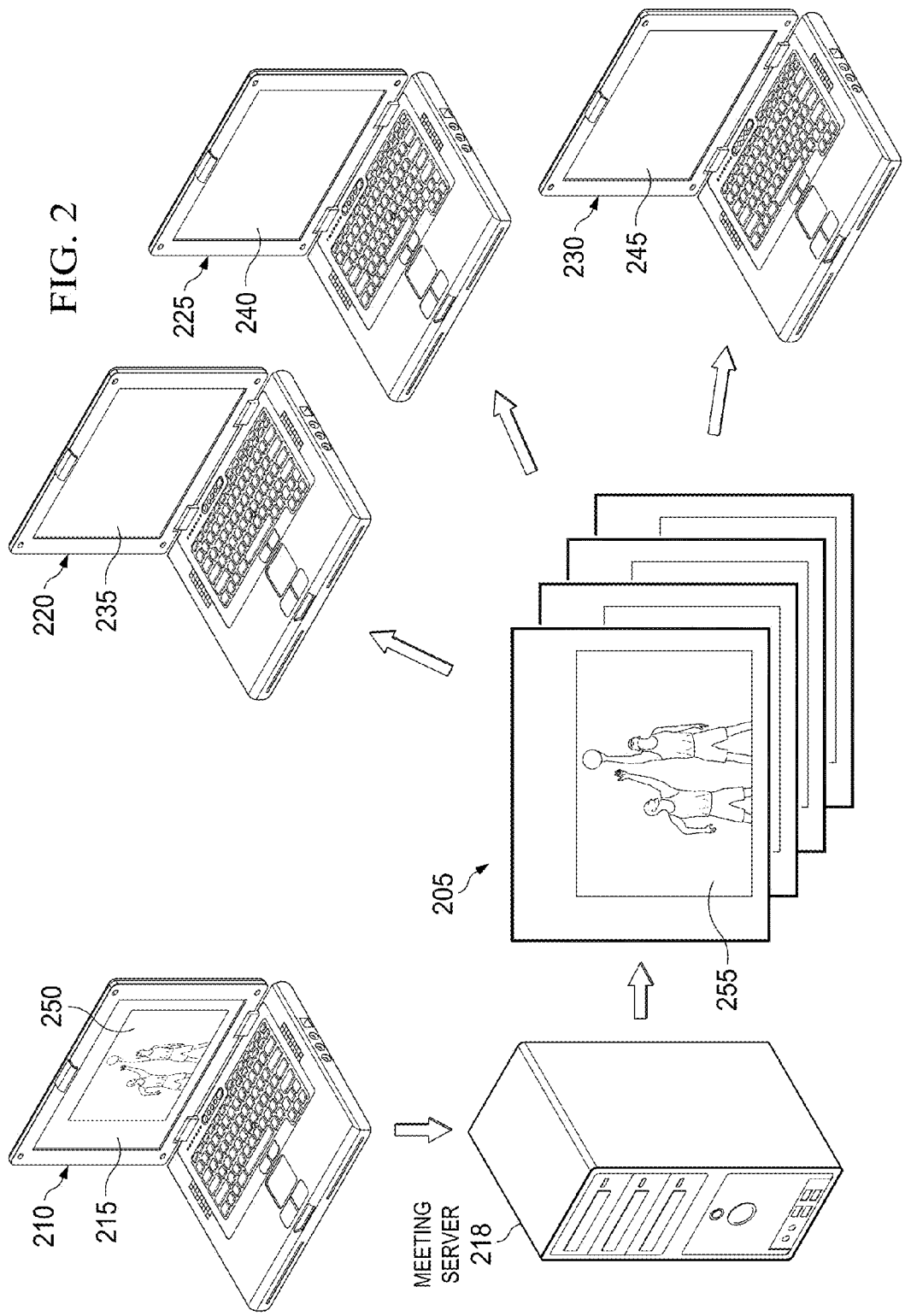

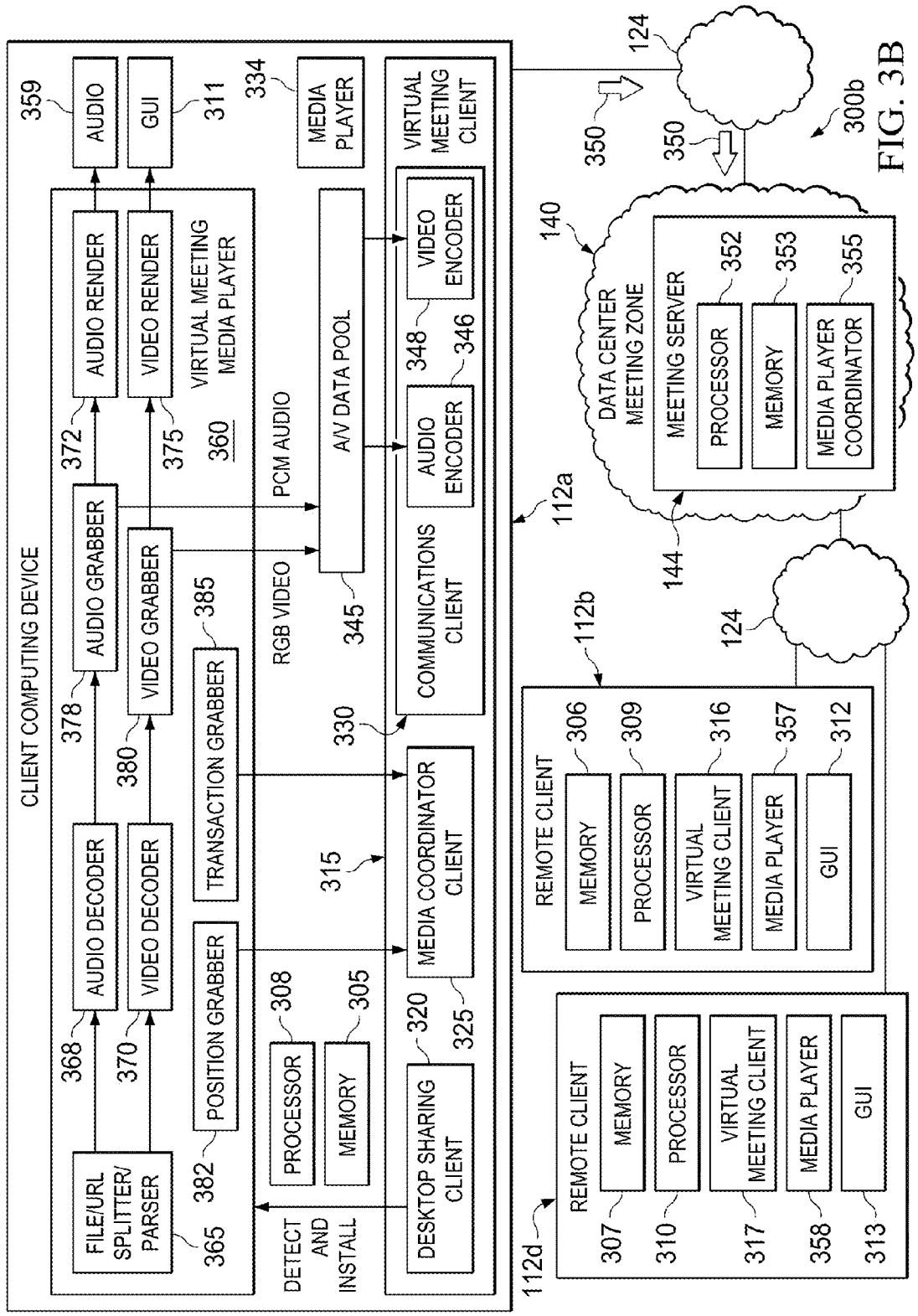

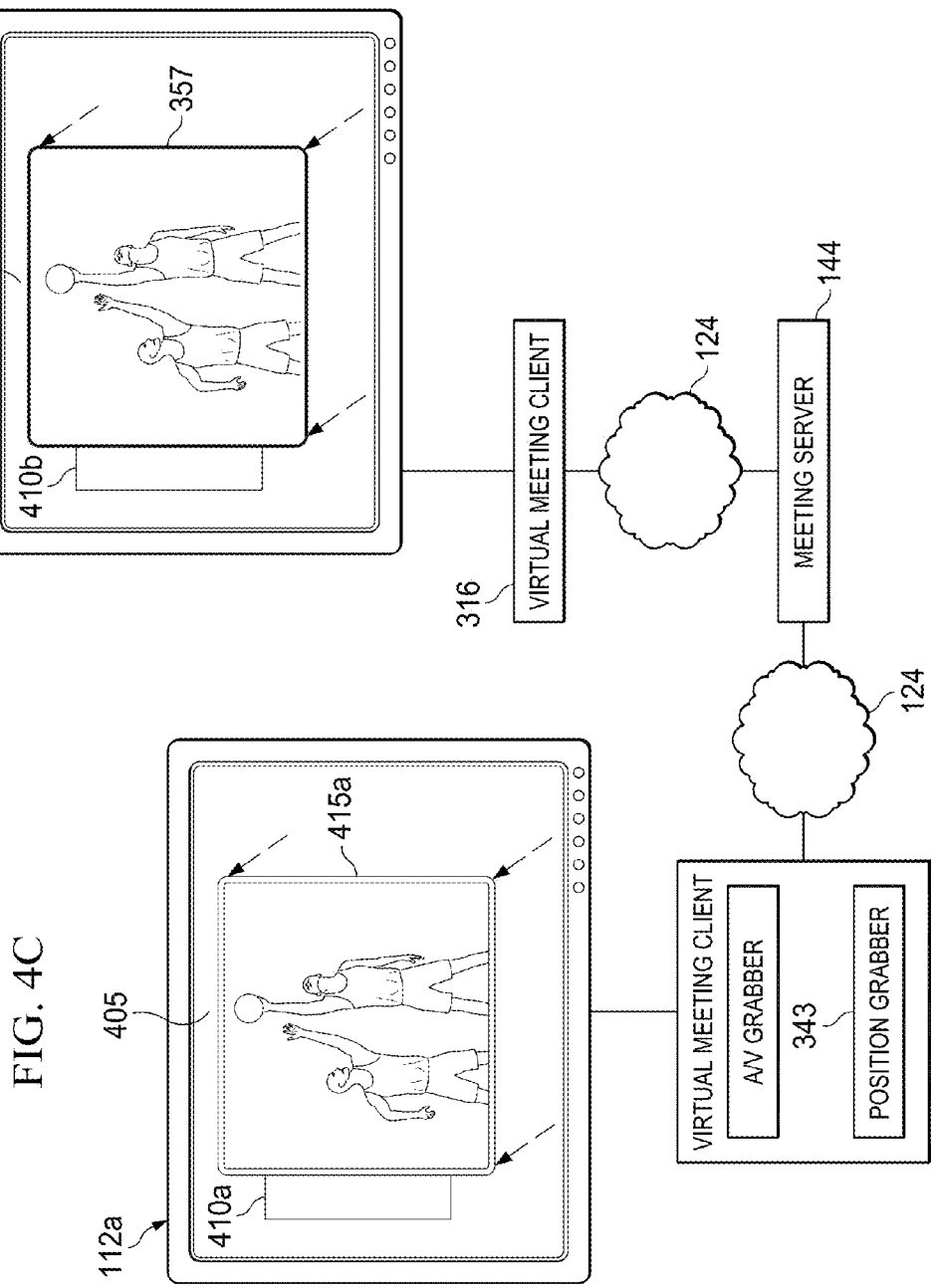

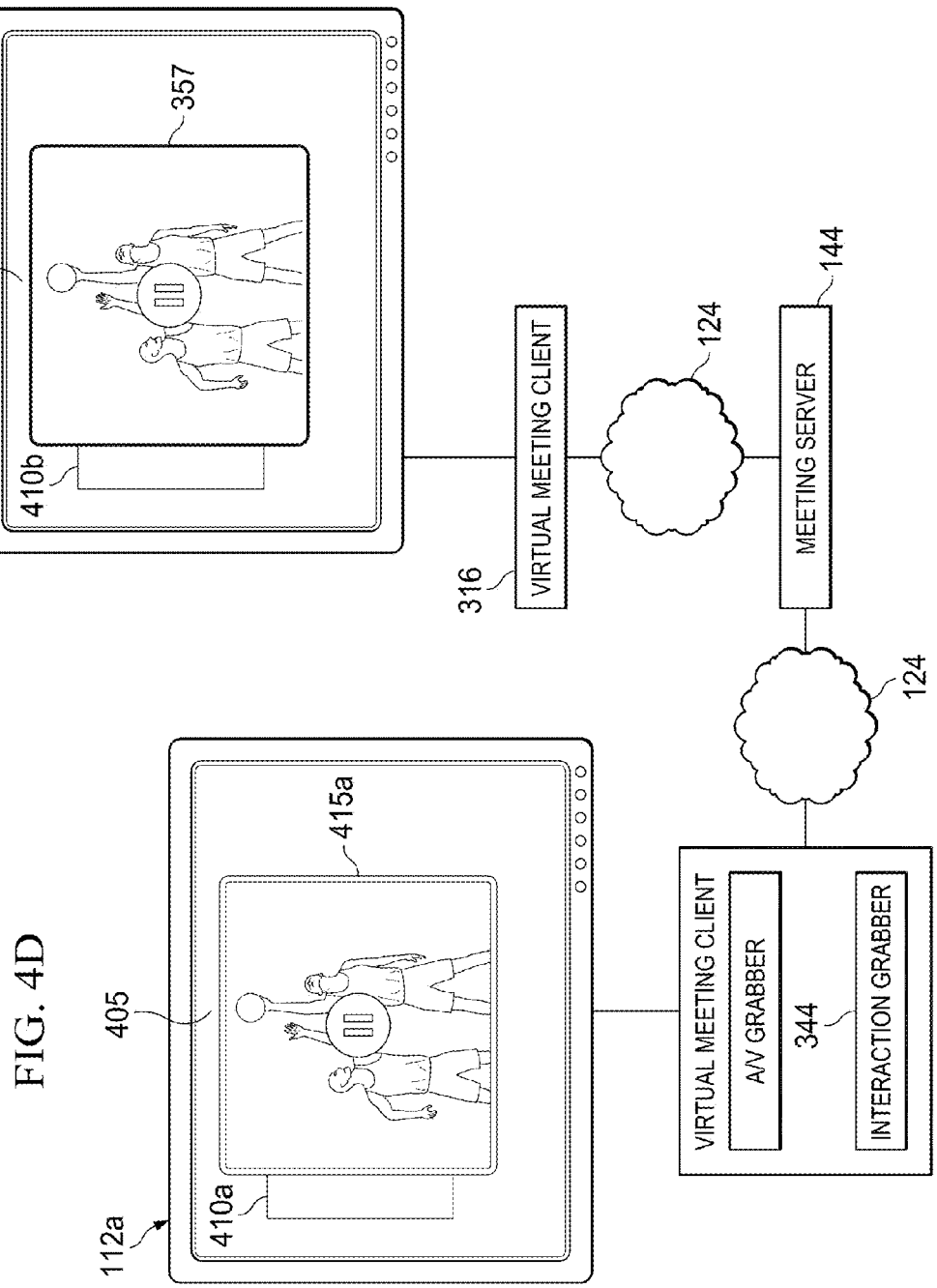

VIRTUAL MEETING VIDEO SHARING

CROSS-REFERENCE TO RELATED APPLICATION

This application is a continuation of U.S. application Ser. No. 13/155,536, filed Jun. 8, 2011, the entirety of which is incorporated herein by reference.

TECHNICAL FIELD

This disclosure relates in general to the field of communications and, more particularly, to virtual meeting video sharing.

BACKGROUND

In certain architectures, sophisticated online conferencing services can be provided for end users of communication and computing devices adapted to connect and participate within an online, virtual conference or meeting. A virtual conferencing architecture can offer an "in-person" meeting experience over a computer network. Conferencing architectures can also deliver real-time interactions between people using advanced visual, audio, and multimedia technologies. Desktop sharing can be enabled using a virtual meeting session, allowing a user to share data present and/or displayed on the user's local computing device to other remote users participating in the virtual meeting or conference. Virtual meetings and conferences have an appeal because they can be held without the associated travel inconveniences and costs.

Further, multimedia capabilities and content have grown increasingly important in the Internet Age. Accordingly, a number of developers and vendors have developed media players for use in playing various forms of multi-media including video, audio, digital slideshows, digital photos, computer-aided animation, among other media. Existing media players include such offerings as Apple's QuickTime Player, Microsoft's Windows Media Player, RealNetworks' RealPlayer, among others. Some media players can integrate, interface, or otherwise be used with, or be launched from, other software applications. As examples, media players can be launched by web browsers in connection with video embedded in a web page, as well as by presentation programs such as Microsoft's PowerPoint, in connection with video included in a multimedia slide presentation.

BRIEF DESCRIPTION OF THE DRAWINGS

FIG. 1 is a simplified schematic diagram of a communication system for coordinating presentation of video during a virtual meeting session in accordance with one embodiment of the present disclosure.

FIG. 2 is a simplified schematic diagram illustrating sharing of video via desktop sharing in a virtual meeting session.

FIGS. 3A-3B are simplified schematic diagrams illustrating example architectures for coordinating presentation of video during a virtual meeting session in accordance with one embodiment of the present disclosure.

FIGS. 4A-4D are simplified schematic diagrams of a communication system showing example interactions of elements within the communication system, including the sharing of video data.

Like reference numbers and designations in the various drawings indicate like elements.

DETAILED DESCRIPTION OF EXAMPLE EMBODIMENTS

Overview

Figure 3A:
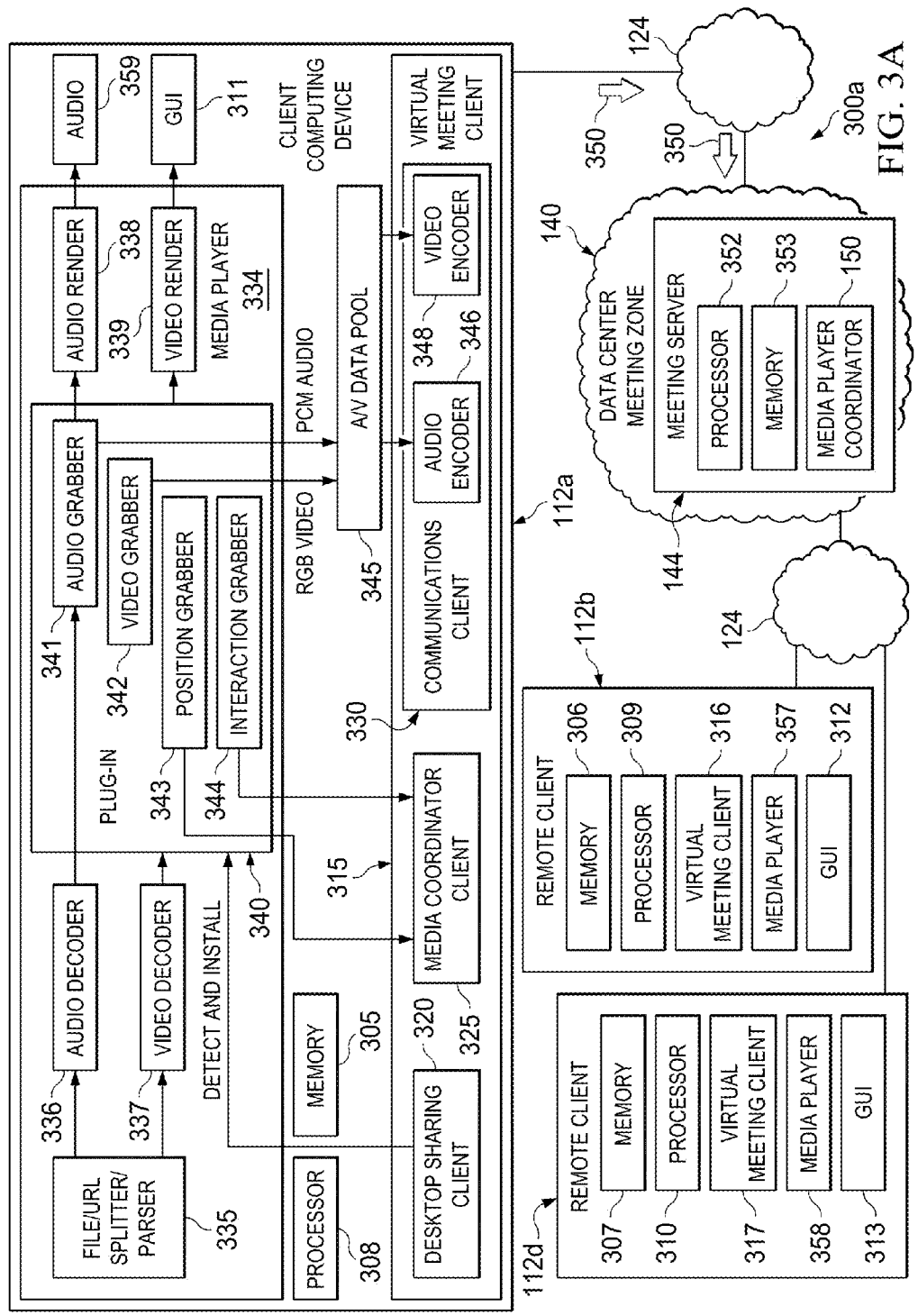

In general, one aspect of the subject matter described in this specification can be embodied in methods that include the actions of identifying an attempt by a first communications device to play video data within a virtual meeting session using a first media player while the first communications device is sharing at least a portion of its desktop with one or more other remote communications devices participating in the virtual meeting session. A copy of the video data can be identified. Video coordination data, including at least a portion of the copy of the video data, can be used to launch one or more media players to present at least the portion of the copy of the video data on the one or more other remote communications devices. The one or more media players can be launched to correspond to a location of the first media player on the shared portion of the desktop.

In another general aspect of the subject matter described in this specification, a system can include a memory element storing data, a processor operable to execute instructions associated with the stored data, and a media player coordinator. The media player coordinator can be configured to receive video coordination data from a first communications device sharing at least a portion of a desktop interface of the first communications device with one or more other remote communications devices participating in the virtual meeting session, the video coordination data sent, from the first communications device, in response to an attempt, by the first communications device, to play video data, using a first media player, within the desktop interface, the video coordination data including at least a partial copy of the video data and position data identifying a location on the desktop for presentation of the first media player. The media player coordinator can be further configured to communicate the video coordination data to the one or more other remote communications devices to prompt the one or more other remote communications devices to each launch a respective media player to play the copy of the video data so that the launched media player is positioned over portions of the shared desktop that include presentation of the first media player.

These and other embodiments can each optionally include one or more of the following features. Position data can be captured identifying a location, on the desktop, where the first media player is to be launched and presented. Position data can be included in the video coordination data. The presentation location of the first media player can be at least partially within the shared portion of the desktop. At least one of the media players launched on the one or more other remote communications devices can be of a type different from the first media player. The copy of the video data can be a copy of an at least partially uncompressed version of the video data, the method further comprising encoding the copy of the video data into a standardized video format. For instance, the copy of the video data can be in RGB format and the copy of video data can be encoded into h.264 format. The location data can be used to omit sharing of a sub-portion of the shared portion of the desktop with the one or more other remote communications devices, the sub-portion corresponding to the location of the first media player presented on the shared portion of the desktop. The video data can include a corresponding audio data component, and a copy of the audio data component can be identified and included in the video coordination data. A plug-in can be installed on the first communications device for use in connection with the first media player, where the plug-in can capture an at least partially un-encoded copy of the video data from the first media player and the copy of the video data is retrieved via the installed plug-in. The video data can be included within a file of another type and the video data can be attempted to be played, on the first communications device, within an interface of an application corresponding to the file of the other type. The first media player can be identified as a first type, and the identification of the first media player type can be included in the video coordination data and used to attempt to launch media players of a similar type on each of the other remote communications devices.

Further embodiments can each optionally include one or more of the following features. A user interaction with the first media player can be identified during the virtual meeting session to cause modification of the launched one or more media players on the other remote communications devices based at least in part on the identified interaction. The interaction can include a user-specified change in the presentation location of the first media player and the one or more media players launched on the other communications devices can be modified to adopt a corresponding change in presentation location and mask the changed location of the first media player. The interaction can include a user-specified request to control a playback feature of the first media player affecting presentation of the video data on the first media player and the one or more media players launched on the other communications devices can be modified to implement a corresponding playback feature affecting presentation of the video data on the respective one or more other communications devices. A particular media player type can be caused to be launched as the first media player on the first communications device when the first communications device attempt to play video data and is sharing at least a portion of a desktop of the first communications device within a virtual meeting session. The first media player of the particular media player type can capture an at least partially un-encoded copy of the video data from the first communications device and the copy of the video data can be retrieved via the first media player of the particular media player type. Media players of the particular media player type can be caused to be launched on each of the other communications devices for presentation of the video data on the one or more other remote communications devices during the virtual meeting session. In some instances a media player coordinator can identify that the first communications device is attempting to play video data while sharing a portion of the desktop of the first communications device within the virtual meeting session, cause a particular media player type to be launched as the first media player, and cause media players of the particular media player type to be launched on each of the other communications devices for presentation of the video data on the one or more other remote communications devices during the virtual meeting session. In some instances, a media player coordinator can serve a plug-in to the first communications device for use in connection with the first media player, wherein the plug-in captures an at least partially un-encoded copy of the video data from the first media player and the copy of the video data is retrieved by the media player coordinator via the installed plug-in. A media player coordinator can be further configured to identify a type of the first media player, and identify and serve a particular plug-in within a plurality of plug-ins, each of the plurality of plug-ins adapted to capture the copy of the video data from the first media player, compatible with the type of the first media player.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

In some implementations of virtual meeting architectures, video sharing within a virtual meeting session can lag in quality, particularly within the context of video played on a desktop being "shared" within the virtual meeting session. This can result, for example, from the techniques employed to share the graphical portions of the shared desktop, such as screen capturing and sampling. The quality of video included in a shared desktop can be enhanced, in some improved virtual meeting architectures, for example, by providing for the capture of raw video data at the device sharing its desktop and playing the captured video on media players launched on the other devices consuming the shared desktop within the virtual meeting session. The launched media players can be synchronized, both temporally and spatially, with the original media player used on the device sharing its desktop in order to make the launched media players mimic the original media player's behavior and appear to be a part of the graphically imaged desktop shared over the virtual meeting session, among other features and advantages.

Turning to FIG. 1, a simplified block diagram is shown illustrating a communication system 100 for use in generating, managing, hosting, and/or otherwise providing virtual meetings within a network environment. Communication system 100 may include a number of endpoints 112*a-e* that can achieve suitable network connectivity via various points of attachment and facilitate users' participation in a virtual meeting. In this particular example, communication system 100 can further include an Intranet 120, a public switched telephone network (PSTN) 122, and an Internet 124, which (in this particular example) offers a pathway to a data center web zone 130 and a data center meeting zone 140 used to serve or host virtual meetings to endpoints 112*a-e*.

In some implementations, data center web zone 130 can include a plurality of web servers 132, one or more databases 134, and one or more recording elements 136. Data center web zone 130 can be used to store and collect data generated and transmitted in connection with a virtual online meeting. Further, recording elements 136 can be used to record video, graphic, and/or audio data transmitted and shared within a virtual meeting, allowing a full multi-media transcript or recording to be generated of the online meeting for use by other users who may not have been able to attend the meeting or by attendees of the meeting who wish to review the content of the meeting. Further, data center meeting zone 140 can include a secure sockets layer hardware (SSL HW) accelerator 142, a plurality of multimedia conference servers (MCSs)/media conference controller (MCC) 144, a collaboration bridge 146, a meeting zone manager 148, and a media player coordinator 150 for use in optimizing the sharing of video data within a virtual meeting. Generally, data center meeting zone 140 can include functionality providing, organizing, hosting, and generating online meeting services and sessions for consumption by communication device clients. Further, as a general proposition, each MCS can be configured to coordinate video and voice traffic for a given online meeting. Additionally, each MCC can be configured to manage the MCS from data center meeting zone 140.

In some implementations, static data, used or generated in connection with a virtual meeting session, can be stored in data center web zone 130. For example, the scheduling data, the login information, the branding for a particular company, the schedule of the day's events, etc. can all be provided in data center web zone 130. Once the meeting has begun, any meeting experience information can be further coordinated (and stored), for example, in data center meeting zone 140. For example, if an individual were to share a document then that meeting experience could be managed by data center meeting zone 140. In a particular implementation, data center meeting zone 140 can be configured to coordinate the automated recognition of meeting participant names from voice data received from endpoint devices (e.g., 112a, 112c, 112e) operated by the meeting participants (e.g., via client software modules).

Note that various types of routers and switches can be used to facilitate communications amongst any of the elements of communication system 100. For example, a call manager element 116 and a unified border element 118 can be provisioned between PSTN 122 and Intranet 120. Also depicted in FIG. 1 are a number of pathways (e.g., shown as solid or broken lines) between the elements for propagating meeting traffic, session initiation, and voice over Internet protocol (VoIP)/video traffic. For instance, a client (e.g., 112a-e) can join a virtual online meeting (e.g., launching integrated voice and video). A client (e.g., 112a) can be redirected to data center meeting zone 140 and a meeting zone manager 148 can direct the endpoint client (e.g., 112a) to connect to a specific collaboration bridge server 146 for joining the upcoming meeting. In instances where the meeting includes VoIP/video streams, then the endpoint client can also connect to a given server (e.g., an MCS 144) to receive those streams. Operationally, there can be two connections established to the collaboration bridge 146 and to the MCS 144. For the collaboration bridge 146, one connection is established to send data and a second connection is established to receive data. For the MCS 144, one connection is established for control and the second connection is established for data. Further, other endpoint clients (e.g., 112b-e) also participating in the meeting can similarly connect to the server (MCS 144) to exchange and share audio, graphic, video, and other data with other connected clients.

Before turning to the operational flows and infrastructure of example embodiments of the present disclosure, a brief overview of a typical meeting environment is provided, along with basic discussions associated with the identification of participants within the meeting environment. For instance, in some instances of a virtual meeting environment, desktop sharing functionality can be provided, allowing one or more participants in the meeting, such as a meeting host, to share a view of the user interface, or desktop, of the participant's computer. For instance, other participants can view events, displays, and interactions performed on and graphically represented on the user interface of a particular participant's computer. For instance, a participant can open a file, locally stored on a first computing device, thereby displaying the file within a graphical user interface (GUI) of one or more applications executed locally on the first computing device. If the desktop of the first computing device is being shared within a virtual meeting, other participants will be able to see the desktop of the first computing device, including the displayed file, as viewed by the local user/meeting participant controlling the first computing device. Further, in some implementations, virtual meeting participants can also observe interactions, tasks, and operations performed on the shared desktop. For instance, virtual meeting participants can observe the movement of cursors, animations, the resizing and opening of various windows and GUIs, among other graphical interactions displayed on the shared desktop. Moreover, in some instances, desktop sharing can also involve the sharing of audio events presented in connection with the shared desktop. For instance, during desktop sharing within a virtual meeting, an alert, sound effect, or other audio data can be presented on the computer sharing its desktop and be shared with the other virtual meeting participants by also audibly presenting the audio data on each of the computing devices of the other virtual meeting participants.

Desktop sharing can involve transmitting complex graphics corresponding to multiple different GUIs of multiple different applications, operating systems, etc., as well as interactions with these GUIs and the particular layout of the desktop displayed at any given time on the computer sharing its desktop ("the sharing computer"). Moreover, in some implementations, it can be desirable to permit desktop sharing and screen captures of open-ended types of applications, operating systems, virtual machine interfaces, content, and GUI elements. As shown, for example, in FIG. 2, this can be achieved by recording a series of screen captures 205 of the sharing computer's 210 desktop 215 during a desktop sharing session and according to a particular sampling rate. The screen captures 205 can then be transmitted (e.g., via a virtual meeting server 218) to the other computing devices 220, 225, 230 participating in the virtual meeting and consuming the shared desktop ("the consuming computers"), allowing the screen captures 205 (and thus the sharing computer's desktop 215) to be displayed, or shared, on the consuming computers' user interfaces 235, 240, 245. Indeed, the series of screen captures 205 can be presented/animated in series according to the sampling rate, so as to reproduce on the consuming computers the shared desktop presented on the sharing computer's display. In some instances, a GUI of a virtual meeting client application can be used to display the shared desktop images, as well as other user interface elements of the virtual meeting.

While screen capture sampling, and other similar techniques, can be effective for realizing animated desktop sharing within a virtual meeting or other environment, screen capture sampling can be limited, for instance, in its ability to capture and animate, in high-fidelity, certain animations, such as fast or sudden cursor movements, as well as video data presented on the desktop of the sharing computer. For instance, as illustrated in the example of FIG. 2, video data can be played by a media player 250 executed on the sharing computer 210. Screen captures 205 can include snapshots 255 of the video presented on the media player during a given screen sampling. When the screen captures 205 are collected and animated on the consuming computers 220, 225, 230 to reconstitute the action presented on the shared desktop, the video data represented in the screen captures may be jumpy, skip, blur, or otherwise deviate in quality from the original video presentation, due to a mismatch, for example, in the sampling rate of the screen captures and refresh rate of the video data originally presented in media player 250 on the sharing computer 210. Consequently, in such instances, video shared within a virtual meeting using desktop may be of low or substandard quality.

In accordance with the teachings of the present disclosure, communication system 100 can overcome certain deficiencies (and others) in offering supplemental functionality to coordinate sharing of video data presented on a shared desktop within a virtual meeting or other environment. For instance, as shown in FIG. 1, a media player coordinator 150 can be provided in connection with a data center meeting zone 140 or other elements of communication system 100 to assist in coordinating sharing of video data presented on a shared desktop. Further, client-side software, such as a virtual meeting client executed on computers participating in the virtual meeting, can also include functionality as an alternative to or supplementing the functionality of media player coordinator 150 to coordinate sharing of video data presented or requested on a shared desktop.

FIGS. 3A and 3B are simplified schematic diagrams showing particular examples of a selected portion 300a-b of communication system 100. In each of these particular examples, three communication system endpoints (or communication devices) 112a, 112b, and 112d are shown, each adapted to access online meeting services provided, at least in part, by a meeting server 144 (such as provided through data center meeting zone 140). For instance, communication devices 112a, 112b, 112d, such as personal computing devices, can be provided with one or more memory elements 305-307, processors 308-310, and GUI display devices 311-313. Communication devices 112a, 112b, 112d can further include network interfaces adapted to communicatively couple the devices 112a-b to one or more elements of the data center meeting zone 140 and meeting server 144 over one or more private and/or public networks (e.g., the Internet 124). Communication devices 112a, 112b, 112d provisioned with GUI display capabilities can make use of multi-media offerings of an online meeting, including desktop sharing functionality. Further, communication devices 112a-b can further include virtual meeting client modules 315-317, permitting each of the communication devices 112a, 112b, 112d to function as meeting clients in a multimedia meeting environment served using data center meeting zone 140.

Semantically, a virtual meeting can include a web-based, client and server virtual meeting application. A virtual meeting client module (e.g., 315-317) can be loaded onto an end user's endpoint, for instance, over the Internet via one or more webpages. A virtual meeting client module (e.g., 315-317) can be loaded as a software module (e.g., a plug-in) and downloaded (or suitably updated) before participating in a virtual meeting. In some instances, data center meeting zone 140 can serve or be used to install the virtual meeting client modules onto the endpoints. If the software module is already resident on the end user's endpoint (e.g., previously downloaded, provisioned through any other type of medium (e.g., compact disk (CD)), then while attempting to participate in an online meeting, that software module would be called to run locally on the endpoint. This allows a given endpoint to establish a communication with one or more servers (e.g., provisioned at data center meeting zone 140 (and/or data center web zone 130), as shown in FIG. 1), using the corresponding client module together with performing any appropriate operations to join a previously scheduled virtual meeting hosted by the data center meeting zone 140 (e.g., using meeting server 144).

By way of illustration, in one particular example, an online meeting includes three participants using communication devices 112a, 112b, 112d. A particular communication device 112a (the sharing computer in this instance) can be sharing at least a portion of its graphical desktop with the other two participants 112b, 112d (the consuming computers). During the course of sharing its desktop, the user of communication device 112a can attempt to display video on the communication device 112a and share the presented video data with the other two participants via desktop sharing. In one implementation, virtual meeting client 315 can include a desktop sharing client 320, media coordinator client 325, and communication client 330. The desktop sharing client 320 can be used to launch, control, and otherwise manage desktop sharing by communication device 112a within the virtual meeting environment. Further, desktop sharing client 320 can include functionality that identifies attempts to present video data on the communication device 112a while communication device 112a is sharing its desktop. In response to identifying an attempt to play video data, for example, using media player 334, the desktop sharing client can install or load a plug-in 340 onto the media player 334, to assist in coordinating the sharing of video data during sharing of the communication device's 112a desktop.

As shown in FIG. 3A, the plug-in 340 loaded onto media player 334 can include an audio grabber component 341, video grabber component 342, position grabber component 343, and interaction grabber component 344, among other components. In the example of FIG. 3A, media player 334 can include a file/URL splitter/parser 335 to extract the video data from a file or online resource, an audio decoder 336, video decoder 337, audio renderer 338, and video render 339 used to present the video data, along with accompanying audio data, on communication device 112a. While video data is being played using the media player 334, screen captures are collected of the shared desktop of communication device 112a. In some instances, the collected screen captures inadequately capture the animation inherent in the video data presented in media player 334. To avoid this, the installed plug-in 340 can intercept audio data, using audio grabber 341, returned from audio decoder 336 and video data, using video grabber 342, returned from audio decoder 337. The captured, raw, un-encoded, uncompressed, or un-rendered video and audio data captured by video grabber 342 and audio grabber 341 can then be passed to an audio/video data pool 345. The communication client 330 of virtual meeting client 315 can then pull the captured data from the data pool 345. In other instances, video grabber and audio grabber 341 can interface with and push the captured data directly to the communication client 330. In either instance, communication client 330 can take the captured audio and video data and encode the raw, uncompressed audio and video data (using audio encoder 346 and video encoder 348) into one or more compressed formats compatible for use with one or more media player types. In some instances, audio encoder 346 and/or video encoder 348 can encode the data into a standardized format usable by a plurality of different media players. In other instances, encoders 346, 348 can encode and compress the data into a proprietary format usable, for example, with a particular preferred or proprietary player type (e.g., specialized player 360 described below). For instance, the uncompressed video data captured from video decoder 337 by video grabber 342 can be RGB video. Audio data captured from audio decoder 336 by audio grabber 341 can be PCM audio. The captured RGB video can be encoded into H.364 video, or some other format, while PCM audio is encoded into G.712 audio, or some other format.

In some instances, the plug-in 340 provided for use with a particular media player can be adapted specifically for use with the particular media player. Media player types can vary in terms of their design, implementation, and interfaces. Accordingly, in some instances, one plug-in (e.g., 340) may not be compatible with all media players. Consequently, in some implementations, a plurality of plug-ins can be available for use with known media player types. Further, prior to loading a plug-in onto a media player executing in connection with a desktop sharing session, the type or identity of the media player can be identified along with a corresponding plug-in compatible with the identified media player type. A compatible plug-in can then be identified and loaded onto the media player (e.g., 334) called or invoked at the sharing computer (e.g., 112a).

Communications client 330 can, in cooperation with other virtual meeting client components (e.g., media coordinator client 325), can package the video data encoded by video encoder 346 (as well as encoded audio data) along with other video coordination data 350 transmitted to the meeting server 144 for processing and distribution to the consuming computers (e.g., 112b, 112d). Meeting server 144 can also include one or more processors (e.g., 352) and memory elements (e.g., 353), as well as utilize a media player coordinator 150, for instance, to coordinate sharing of the video data played in connection with the shared desktop. Upon receiving video coordination data 350, including the encoded video data, media player coordinator 150 can be used to identify that the video coordination data is being sent in connection with the sharing of a desktop presenting the native video data. Further, the received video coordination data can be used (for instance, by media player coordinator 150) to trigger the launching, initiation, installation, or invocation of media players (e.g., 357, 358) on the other communication devices 112b, 112d participating in the desktop sharing session. The media players 357, 358 can be launched to play the encoded video delivered in the video coordination data 350 and mimic the player launched on the sharing computer's desktop. Accordingly, media player coordinator 150 can be used to provide the encoded video data to the media players 357, 358 executed on communication devices 112b, 112d.

Further, media player coordinator 150 can coordinate playing of the video data on the media players 357, 358 so that the playing of the video is substantially synchronized to the video played on media player 334 of communication device 112a. Indeed, in some instances, plug-in 340 can delay playing of the video data on media player 334 to allow time for delivering the captured and encoded video data to communication devices 112b, 112d and coordinate the launching (and/or installation) of media players 357, 358 on the devices 112b, 112d. Indeed, in some instances, command data can also be included in video coordination data to assist the media players, executing in the desktop sharing session, to synchronize play of the video data. Synchronizing play of the video data can be advantageous, for example, within a virtual meeting as participants describe or narrate aspects of the shared video during the virtual meeting. Were the video not synchronized, there could be a mismatch between audio communications within the virtual meeting related to the video, and the actual content of the video presented, as one user describes video content asynchronously presented relative to the video's presentation on other participants' communication devices.

Figure 4A:
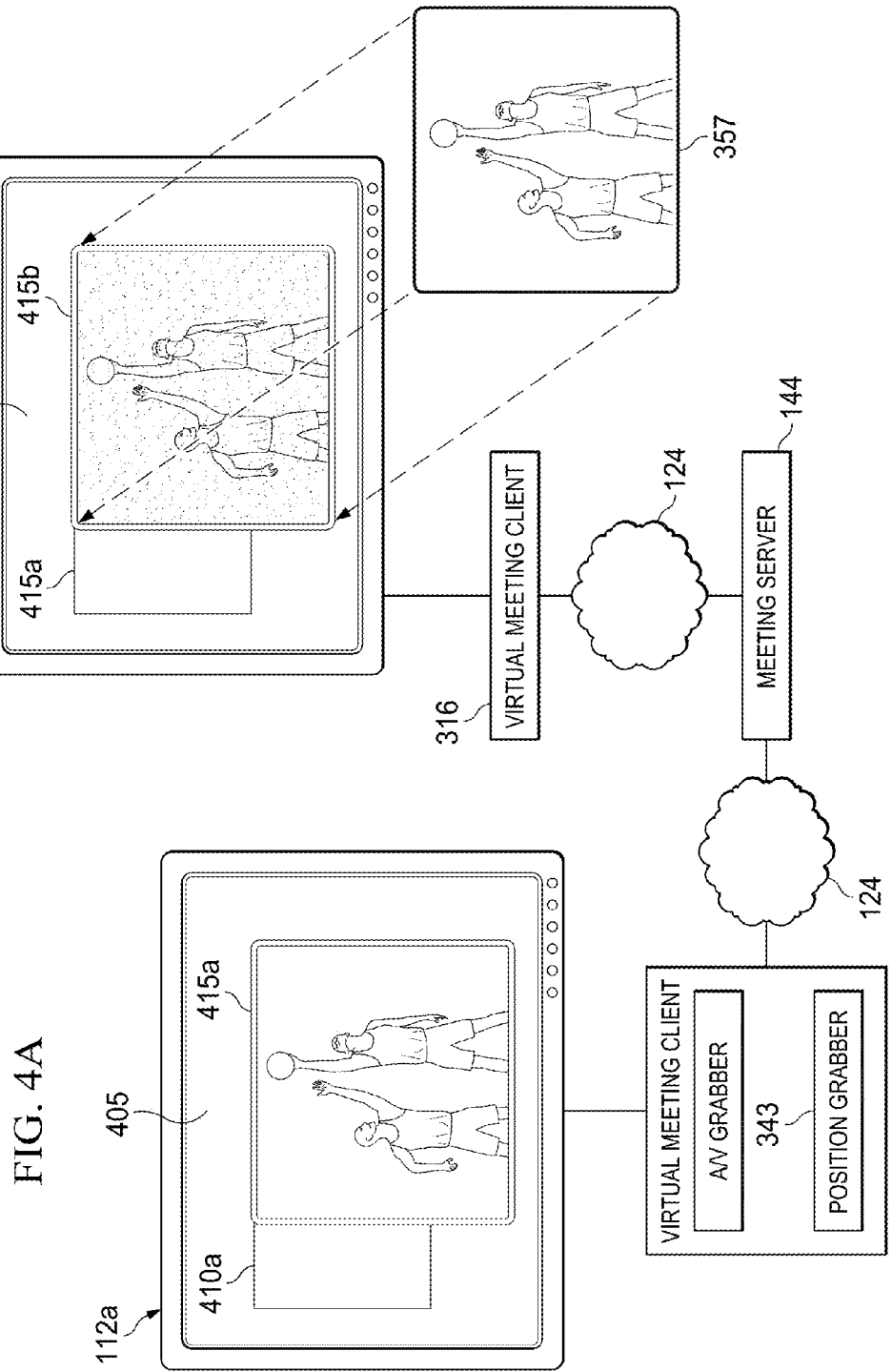

Additionally, media player coordinator 150, for instance, in cooperation with virtual meeting clients 316, 317, can coordinate the placement of the media players 357, 358 in the respective portions, or windows, of GUIs 312, 313 displaying the shared desktop of communication device 112a. Placement of the media players 357, 358 can be managed so that the size and location of the media players 357, 358 displayed on GUIs 312, 313 correspond to the location, on the shared desktop, of the presentation of media player 334. For instance, turning to FIG. 4A, a desktop 405 of communication device 112a includes multiple GUI elements 410a, 415a, of which is included a GUI element 415a of media player 334 playing video data. As shown in FIG. 4A, a copy 420 of the desktop is shared and presented on a user interface of another communication device 112b participating in a virtual meeting. Elements 410a and 415a are included in the copy 420 of the shared desktop (as elements 410b, 415b respectively). However, as represented by element 415b, the quality of the video data may be substandard, after being reconstituted (e.g., from a series of screen captures) on the consuming device 112b. Accordingly, a media player 357 can be launched based on video coordination data received and processed by meeting server 144 (and in cooperation with virtual meeting client 316) to overlay, or mask, the low-quality video GUI element 415b, as represented in FIG. 4A. Masking the video GUI 415b element, included in the transmitted shared desktop screen captures, with the launched media player 357, serves to hide the portion of the shared desktop including screen captures of the playing video as presented on the sharing computer. Further, the launched media player 357 hides the substandard video screen capture image with a presentation of the encoded video, in native quality, as played on the launched media player 357. In this manner, the launched media player 357 can appear to be a part of the screen captures collected during desktop sharing in a virtual meeting environment. Indeed, in some implementations, and in cooperation with virtual meeting client 316, the launched media player can be embedded, stitched, or otherwise integrated with the user interface of the virtual meeting client 316, to make the launched media player 357 appear to be seamlessly included in the screen captures of the shared desktop.

Figure 4B:
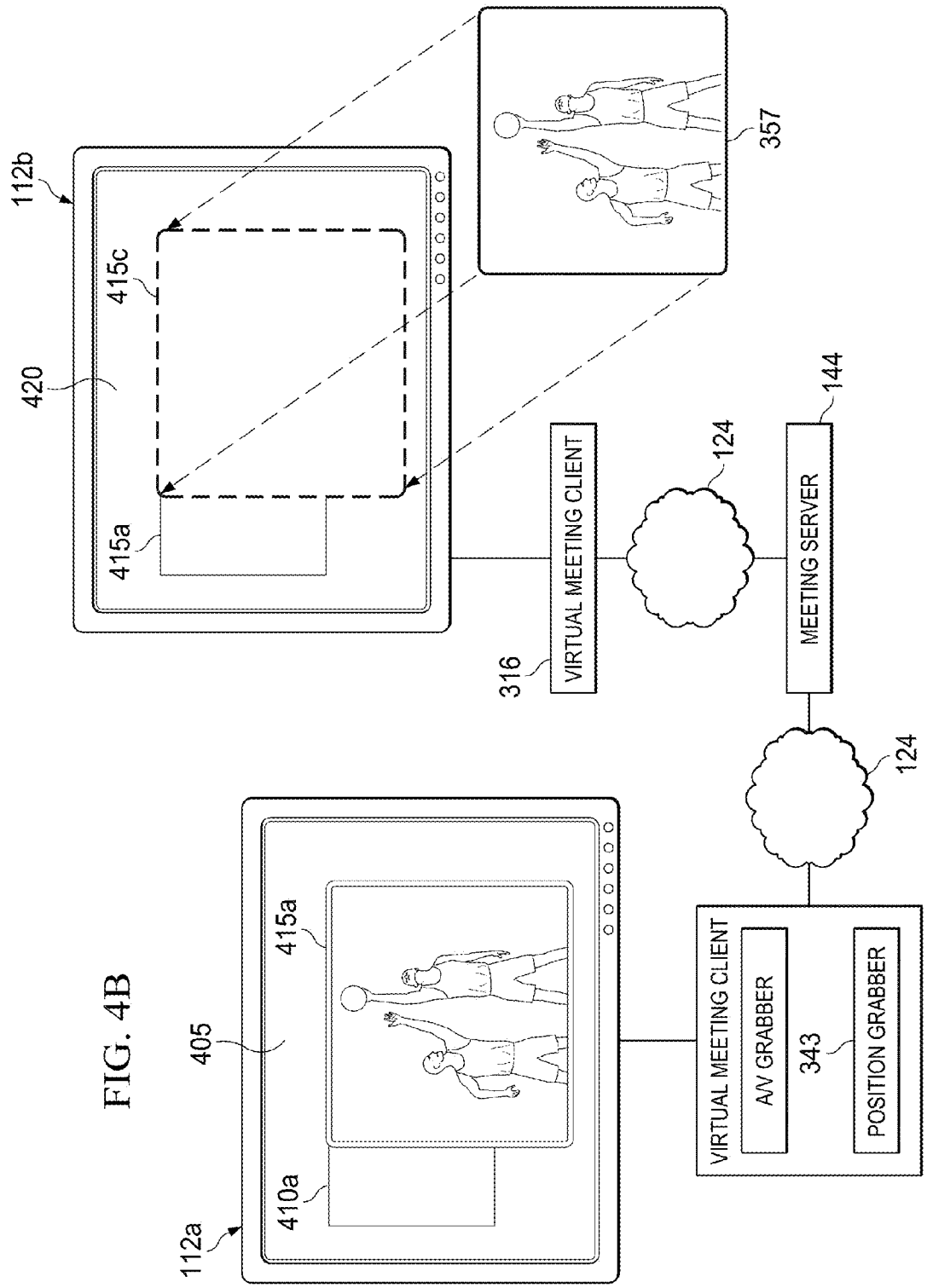

Turning now to FIG. 4B, not only can a launched media player (e.g., 357, 358) be coordinated to mask a particular portion of the shared desktop to hide the presentation of lower quality video data captured in screen captures of the desktop, but in some instances, meeting server 144 (e.g., using media player coordinator 150) can further "edit-out" the original media player (e.g., 334) included on the shared desktop by removing the particular portion of the shared desktop corresponding to the original media player's GUI from the screen captures of the shared desktop. For instance, as shown in FIG. 4B, GUI element 415c, representing the portion of the shared desktop 405 that included presentation of video GUI element 415a, has been erased, filtered, or otherwise removed. Further, as in the example of FIG. 4A, the launched media player can be positioned over the empty GUI element 415c, thereby replacing a screen capture of the video data presented on desktop 405 with a media player 357 playing the video data, as captured, for instance, using video grabber 342. Additionally, in some implementations, the example of embodiment of FIG. 4B may possess the additional advantage of decreasing the bandwidth and memory needed for transmission of the collection of screen captures, as bytes of data that would have been dedicated to capturing and reproducing an unneeded screen capture of the original media player (e.g., 334), as played on desktop 405, would be omitted from the data stream forwarding the screen captures to the consuming computers (e.g., 112b).

Returning to the discussion of FIG. 3A, in either of the examples of FIGS. 4A or 4B, proper dimensioning and positioning of the launched media players 357 (and 358) can be guided or otherwise based upon position data captured, for example, by position grabber 343, and describing the location and dimensions of the media player 334 as launched (or as it would be launched) on communication device 112a. Such position data can be further included in video coordination data 350 and used and processed by one or more of media player coordinator 150 and/or virtual meeting clients 316, 317 in the launching and positioning of media players 357, 358.

In some instances, a user of communication device 112a, during sharing of the desktop and playing of video data using media player 334, may interact with or otherwise manipulate media player 334. Consequently, media players 357, 358 launched to synchronize with media player 334 can be caused to mimic these interactions in response, in order to preserve the illusion that media players 357, 358 are actually images of the shared desktop (and not distinct media player instances). For instance, a user of communication device 112a can re-position, move, minimize, maximize, re-size, or otherwise change the position of the media player 334 user interface during the desktop sharing of communication device 112a. Accordingly, position grabber 343 can capture and send modified position data to meeting server 144 for use in communicating the changes to the media player's 334 positioning. Modified position data can then be used to affect corresponding changes to positioning and dimensions of the media players 357, 358 launched on communication devices 112b, 112d, so as to maintain masking of the image of media player 334 communicated in screen captures of the shared desktop. For instance, as shown in FIG. 4C, video GUI element 415a has been moved on desktop 405. Accordingly, updated position data can be transmitted to affect a corresponding repositioning of media player 357 on communication device 112b.

Returning to FIG. 3A, an interaction grabber 344, provided, for example, in plug-in 340, can also be used to capture data describing a user's interactions, including interactions triggering changes to media player's 334 positioning. User interaction data captured by interaction grabber 344 can also be communicated to meeting server 144 (and virtual meeting clients 316, 317), for instance, in video coordination data 350. Other user interactions involving the media player 334 can also be captured, in addition to changes to the player's positioning. For instance, some media players include controls allowing for the pausing, fast-forwarding, stopping, resuming, skipping, etc. of video data presented in the media player, as well as allowing for the adjustment of the volume of the player, the player's video resolution, and other media player settings. Additionally, users can select additional video data, or a series of video files to be played in sequence while the media player in open and playing the initially-selected video data. Each such interaction, among others, can be captured by the interaction grabber 344 and communicated to media player coordinator 150 and/or virtual meeting clients 316, 317 to attempt to affect or model similar interactions with media players 357, 358. For instance, as illustrated in FIG. 4D, a user of communication device 112a has paused media player 334 at a certain point during playback of the video data, as indicated in video GUI element 415a. The user's interaction with the media player 334, to pause the video, can be captured by interaction grabber 344 and used to pause media player 357 at the same point in the playback of the captured video data, as shown in FIG. 4D.

In some instances, the media players (e.g., 357, 358) launched on the consuming computers (e.g., 112b, 112d) can be of a type different from the media player (e.g., 334) launched on the sharing computer (e.g., 112a). Using such an approach can allow favored or default media players on a particular consuming computer to be used in connection with presenting video data played on a shared desktop. However, while captured video can be encoded in a plurality of formats to make the captured video compatible with a number of different media players, some media players installed, preferred, or otherwise used by consuming computers may be incompatible with the video data as encoded, for example, by video encoder 348. Further, while the captured video data can be encoded by communications client 330 to make the video compatible with one or more different media players, some other features, available in one media player, may not be available in another. For example, features or functionality corresponding to a particular interaction or control identified on media player 334, using interaction grabber 344, may not be available on one or more of the media players (e.g., 357, 358) that could be launched and used by the consuming computers to consume the captured video data. Accordingly, in some instances, media player coordinator 150, together with virtual meeting clients (e.g., 316, 317) can attempt to identify whether one or more compatible media players are installed on the consuming computers receiving the shared video data. If no such players are found, virtual meeting clients (e.g., 316, 317), for example, can be used to load a compatible media player on the consuming computer (e.g., 112b, 112d). Indeed, in still other instances, media player coordinator 150, together with virtual meeting clients (e.g., 316, 317) can launch, or install a particular preferred, customized, or standardized media player in connection with providing video from a shared remote desktop. For instance, encoding of the video data by communications client 330 (using video encoder 348) can be tailored to a specialized, virtual meeting-specific media player. Further, instances of the same type of specialized media player can be loaded onto each end-point device in connection with the loading of virtual meeting clients (e.g., 316, 317) installed on the devices.

In another implementation, a specialized media player can also be launched on the sharing computer upon identifying that video data is to be played on the sharing computer during a desktop sharing session. Turning to FIG. 3B, another simplified schematic diagram is illustrated showing another example of a selected portion 300b of communication system 100. While in the example of FIG. 3A, a plug-in 340 was loaded onto a media player 334 in response to an attempt by the sharing computer to play video during a desktop sharing session, in the example of FIG. 3B, a specialized media player 360 is launched in response to an attempt to play video during desktop sharing. The specialized media player 360 can include much of the functionality of plug-in 340 as well as the basic functionality of a standard media player (such as media player 334). For instance, as shown in FIG. 3B, specialized media player 360 can include a file/URL splitter/parser 365 to extract the video data from a file or online resource, an audio decoder 368, video decoder 370, audio renderer 372, and video render 375, to extract and present video and audio data on communication device 112a. Further, specialized media player 360 can also include an audio grabber component 378, video grabber component 380, position grabber component 382, and interaction grabber component 385 and other components that function similar to corresponding components in plug-in 340.

In accordance with the particular example of FIG. 3B, the communication device 112a may attempt to play particular video data using a default or favored media player (e.g., 334) with traditional functionality, such as a QuickTime player, Windows Media Player, RealPlayer, etc. Upon identifying that the communication device 112a is sharing its desktop while attempting to play the video data, the desktop sharing client 320 of virtual meeting client 315 can intervene, interrupting the launching of media player 334, and launching (and/or loading or installing) specialized media player 360 in lieu of media player 334 or other, more traditional media players installed on the communication device 112a. Indeed, in some implementations, the specialized media player 360 may only be launched in instances where it is identified that the communication device 112a is operating in an environment that could make use of the specialized media player's 360 supplemental functionality (e.g., components 378, 380, 382, 385, etc.), such as in a virtual meeting session and/or when sharing its desktop in a network environment, etc.

In the example of FIG. 3B, a media player 360, equipped with a video grabber component 380 and one or more of an audio grabber component 378, position grabber component 382, and interaction grabber component 385, can function similar to the media player 334 when equipped with plug-in 340. For instance, media player 360 can utilize video grabber 380 to pass uncompressed, decoded video data to a data pool 345 that can then be transmitted to consuming computers (e.g., 112b, 112d) for display in connection with sharing of the desktop of communication device 112a. In some instances, the video grabber component 380 can simply forward video data rendered by the media player 360, itself, using video renderer 375. In such instances, the media player 360, itself, can be configured to encode and compress the video data into the format preferred by the virtual meeting system, thereby making it possible to bypass (or optionally do away with) video encoder 348 (and audio encoder 346) of communications client 330.

In the particular implementation illustrated in FIG. 3B, media player 360 passes uncompressed video data to data pool 345, making the uncompressed video data available to communications client 330. The communications client 330 can encode and compress the raw data obtained from media player 360 and send this data to meeting server 355 for use in displaying the video data on consuming computers (e.g., 112b, 112d). As in the examples of FIG. 3A, media player coordinator 150, together with virtual meeting clients (e.g., 316, 317), can be used to launch media players on the respective consuming computers in order to play the video captured and encoded at the sharing computer (e.g., 112a). As noted above, launching media players on the consuming computers can include also launching specialized media players on the consuming computers. In some cases the media players launched on the consuming computers (in any of the examples of FIGS. 3A and 3B) can be an instance or version of specialized media player 360, adapted to play video data as encoded at the sharing computer 112a. This can further involve inspecting each of the consuming computers to see if the specialized player has been installed on the device, and if it has not, initiating the loading and installation of the specialized player on the device. In some cases, media player coordinator 150, together with virtual meeting clients (e.g., 316, 317) can also inspect the consuming computers to see if another media player is available that is also compatible with the video data and/or functionality of video sharing within a desktop sharing session.

In some instances, desktop sharing client 320 can be configured to load or invoke either a specialized media player (i.e., similar to media player 360) or plug-in 340 in connection with a video presentation event detected during desktop sharing by a sharing computer. In other instances, desktop sharing client 320 can elect to load or invoke either a specialized media player 360 or plug-in 340, based on certain conditions or preferences (such as pre-defined administrative, user, or meetings preferences). In some instances, it can be advantageous to use either one or the other of specialized media player 360 or plug-in 340 in connection with video presentation event in a desktop sharing session. As an example, it can be advantageous to use the plug-in 340 implementation when video has been launched, on the sharing computer, from another application, such as a presentation application. The application from which the video is launched may have a preferred media player and substituting the application's preferred player with the specialized media player 360 may adversely affect performance of the application and interrupt the shared desktop's performance. For instance, launching a specialized player 360 to handle video data launched from another application (such as a PowerPoint presentation or web-based application) may cause a windowing event on the desktop of the sharing computer, deactivating the application's window to present the specialized player, among other complications. Other instances, conditions, and use cases can also be catalogued and influence whether desktop sharing client 320 launches specialized media player 360 or plug-in 340, and such implementations are within the scope of the present disclosure.

Further, as noted above, a video file selected for presentation on the sharing computer (e.g., 112a) can include both video and audio data that can be played by a media player. Further, in some implementations, a virtual meeting session can itself have video and audio portions. The video component of a virtual meeting session can be displayed on video display devices of the communication devices participating in the virtual meeting session. Audio data can be presented using speakers (e.g., 359) integrated into the participating communication device or, in some instances, through a telephonic device used by a meeting participant concurrently with a graphics-enabled computing device to send and receive audio data including voice (e.g., in connection with verbal discussions within the virtual meeting). In some instances, audio data captured by an audio grabber (e.g., 341, 378) can be packaged with captured video data and other video coordination data for delivery to consuming computers (e.g., 112b, 112d), where both the encoded video data and audio data are played by media players launched on the consuming computers. In other instances, audio data can be included in and presented to virtual meeting participants via an audio channel of the virtual meeting presenting the audio portion of the virtual meeting. In some instances, video and audio are captured differently within a virtual meeting session. Accordingly, in some examples, relaying quality audio to other meeting participants is less an issue or concern as relaying quality video, and audio data presented on a sharing computer, during desktop sharing, can be forwarded to consuming computers via the standard audio channel of the virtual meeting.

It should be appreciated that the examples shown and described in connection with FIGS. 3A-3B are but simplified examples provided to introduce and illustrate some of the concepts above. The examples of FIGS. 3A-3B are non-limiting examples and alternate implementations can be realized applying concepts similar to those described above. For instance, video coordination need not be packaged in a single transmission or data flow, but can be transmitted as a plurality of distinct data flows (e.g., one flow communicating the encoded A/V data, one flow communicating position data, a subsequent flow communicating updated position data, etc.). Further, while in FIGS. 3A-3B, position and transaction data are described as being captured at the media player level, either through a plug-in 340 or specialized media player 360, other elements can be used to capture and communicate all or a portion of media player position, dimensions, interaction attributes. For instance, virtual meeting clients (e.g., 315) can capture certain interactions or request media player position and dimensions from a standard media player (e.g., 334), or the communication device's operating system, etc. Further, some of the components and functionality described in connection with FIGS. 3A-3B can be combined into single components, and additional functionality (such as a command data component, used in the synchronization of media players) can be included to supplement or replace the functionality of components described in the examples above.

Figure 5B:
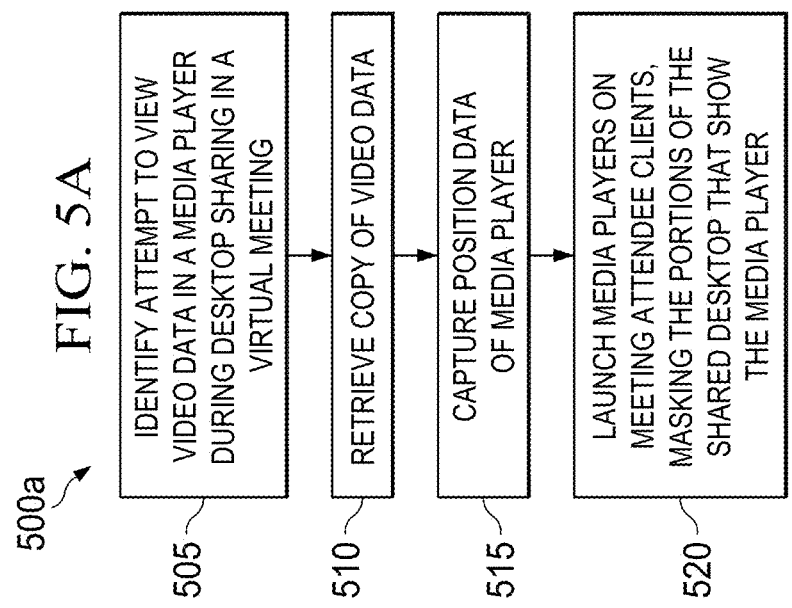
FIGS. 5A-5D are simplified flowcharts illustrating example techniques for coordinating presentation of video during a virtual meeting session in a communication system environment.
Figure 5A:
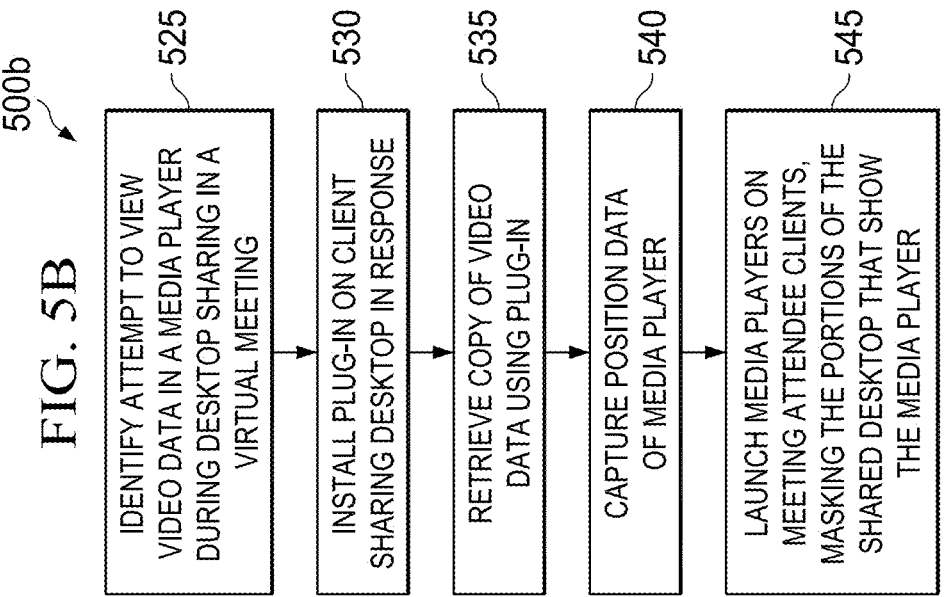
Figure 5D:
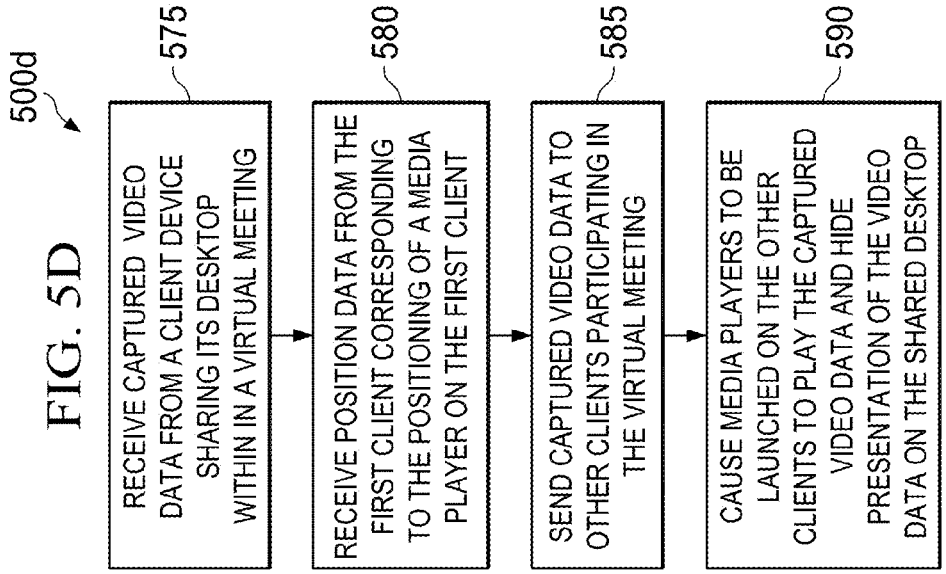
Figure 5C:
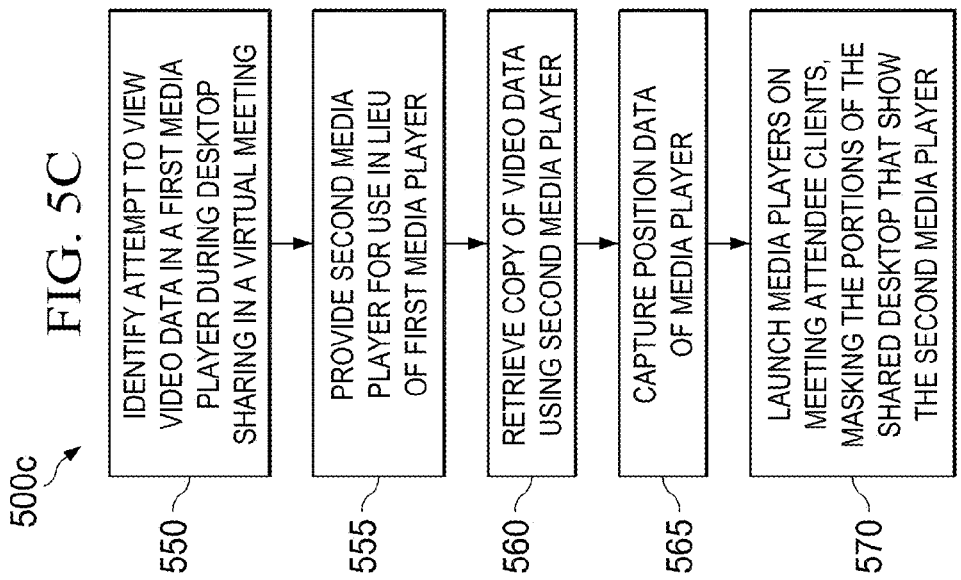

Turning to FIGS. 5A-5C, simplified flowcharts 500a-c are shown of example techniques for coordinating the presentation of video data from a desktop shared within a virtual meeting environment. Beginning with FIG. 5A, an example technique is illustrated in flowchart 500a, where an attempt, by a first computing device, to play video data is identified 505 within a virtual meeting session as the first computing device shares at least a portion of its desktop with at least one other computing device participating in the virtual meeting session. A copy of the video data can be retrieved 510, or captured, in response to the attempt to play the video data. Further, position data can be captured 515 identifying a location, within the graphical user interface, or desktop, of the first computing device, initially designated for the presentation of the first media player (and the video data). At least a portion of the retrieved video data and the position data can then be used to launch one or more media players 40 on the other participating devices, in order to present the retrieved video data on the other participating devices. Further, the position data can be used to coordinate the display of the media player on the participating devices in order to mask an area corresponding to the first media player as presented on the shared portion of the first computing device's desktop.

Turning to FIG. 5B, another example technique is shown, in flowchart 500b, including identifying 525 an attempt to view video data in a first media player on a desktop being shared during a virtual meeting. A plug-in can be installed 530 on the first media player in response to identifying the attempt to view the video data within a desktop sharing session. The video data can be retrieved 535 using the installed plug-in. Further, position data can be captured 540 describing the positioning (including dimensions) of the first media player presented on the desktop being shared. Using the position data, media players can be launched 545 on other computing devices participating in the virtual meeting, and consuming the shared desktop, to play the captured video data and mask portion of the desktop showing the first media player.

Turning now to FIG. 5C, flowchart 500c shows that an attempt can be identified 550 to view video data using a first media player on a shared desktop. In response, a second media player can be provided 555 for use in playing the video data. The second media player can be launched, invoked, installed, or otherwise provided 555 in order to play the video data on the second media player in lieu of playing the video on the first media player. The second media player, in some instances, can possess specialized functionality for use in coordinating the playing of video within a virtual meeting environment that includes desktop sharing. Accordingly, a copy of the video data can be retrieved 560 (for instance, using the second media player) so as to be forwarded to and played on the other computing devices participating in the virtual meeting and consuming the shared desktop. Further, position data can be captured 565 (in some instances, using the second media player). Using the captured position data, media players can then be launched on the other meeting participant client computing devices to play the captured video data while masking the portions of the shared desktop that include presentation of the media player.

Further, in FIG. 5D, flowchart 500d shows an example technique including receiving 575 a copy of video data captured on (and received from) a client device sharing its desktop within a virtual meeting. Further, position data can also be received 580 corresponding to the positioning of a first media player on the shared desktop designated to play the video data. The captured copy of the video data can be sent 585 to other clients participating in the virtual meeting and consuming the shared desktop. Media players can be launched 590 on the other clients participating in the virtual meeting in order to play the captured copy of the video data. The media players can be launched 590 so as to be coordinated with the playing of the media player on the client device sharing its desktop. For instance, the media player can launched 590 so as to mask portions of the shared desktop that include the first media player, as displayed on the desktop of the first device. Further, in some instances, the launched media players can be synchronized with the first media player so as to mimic the effects of user interactions and events on the first media player, including playback features of the first media player, playback timing, relocation and resizing of the first media player's user interface, etc.

It is imperative to note that present Specification and Figures describe and illustrate but one of the multitude of example implementations of a communication system 100. Any of the modules or elements within client endpoints 112a-e and/or meeting servers (e.g., MCSs/MCC 144) data center meeting zone 140, etc. may readily be replaced, substituted, or eliminated based on particular needs. Furthermore, although described with reference to particular scenarios, where a given module (e.g., virtual meeting client modules 315-317, plug-in 340, media players 334, 357, 358, 360, media player manager 355, etc.) is provided within endpoints 112a-e, MCSs/MCC 144, data center meeting zone, etc., any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e can be representative of any type of client or user wishing to participate in a virtual meeting session in communication system 100 (e.g., or in any other online platform). Furthermore, endpoints 112a-e can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind, smartphone, tablet computer, or any other device, component, element, or object capable of initiating voice, audio, video, media, or data exchanges within communication system 10. Endpoints 112*a-e* may also be inclusive of a suitable interface to the human user, such as a microphone, a display, or a keyboard or other terminal equipment. Endpoints 112*a-e* may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC servers 144, web servers 132, among other servers shown and described, can include network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, PSTN 122, and Internet 124 represent a series of points or nodes of interconnected communication paths for receiving and transmitting packets of information that propagate through communication system 100. These networks may offer connectivity to any of the devices or endpoints illustrated and described in the present Specification. Moreover, Intranet 120, PSTN 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, PSTN 122, and Internet 124 can support a transmission control protocol (TCP)/IP, or a user datagram protocol (UDP)/IP in particular embodiments of the present disclosure; however, Intranet 120, PSTN 122, and Internet 124 may alternatively implement any other suitable communication protocol for transmitting and receiving data packets within communication system 100. Note also that Intranet 120, PSTN 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, PSTN 122, and Internet 124 can foster all such communications and, further, be replaced by any suitable network components for facilitating the propagation of data between participants in a conferencing session.

It should also be noted that endpoints 112*a-e* and MCSs/MCC 144 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location are responsible for certain activities associated with desktop or video sharing. In a general sense, the arrangement depicted, for example in FIG. 2, may be more logical in its representations, whereas a physical architecture may include various permutations/combinations/hybrids of these elements.

Note that in certain example implementations, the name recognition functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown, for example, in FIGS. 3A-3B) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIGS. 3A-3B) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, name recognition engines 150 can include software in order to achieve the name recognition functions outlined herein. These activities can be facilitated, for example, by MCSs/MCC 144 and/or, in some instances, by the various endpoints 112*a-e*. MCSs/MCC 144 and/or other elements, devices, or systems of data center meeting zone 140 can include memory elements for storing information to be used in achieving the functions of media player coordinator 150, and other modules, plug-ins, and system elements as outlined herein. Additionally, MCSs/MCC 144 and/or other elements, devices, or systems of data center meeting zone 140 can include one or more processors that can execute software or an algorithm to perform the functions of media player coordinator 150, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term "memory element." Similarly, any of the potential processing elements, modules, and machines described in this Specification should be construed as being encompassed within the broad term "processor."

Note that with the examples provided herein, interaction may be described in terms of a certain number or combination elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures.

It is also important to note that the steps discussed with reference to FIGS. 1-5D illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual conferencing environments or arrangements, the present disclosure may be used in any online environment that could benefit from such technology. For example, in certain instances, computers that are coupled to each other in some fashion can utilize the teachings of the present disclosure (e.g., even though participants would be in a face-to-face arrangement). Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   at a server device, identifying an attempt by a sharing client device to share display data being displayed on at least a portion of a display of the sharing client device with one or more consuming client devices participating in a virtual meeting session with the sharing client device, the display data including video data and having a first format comprising a series of screen captures;
   receiving from a consuming client device participating in the virtual meeting session video coordination data including playback quality information of the video data in the first format;
   automatically determining from the video coordination data that playback quality of the video data in the first format at the consuming client device is degraded; and
   in response to determining that the playback quality of the video data in the first format is degraded, automatically sending from the server device to the consuming client device an instruction to launch a media player native to the consuming client device, the instruction causing the media player on the consuming client device to play the video data in a second format, supplied by the sharing client device and that is compatible with the native media player, at a portion of a display of the consuming client device at which the degraded video data in the first format would have otherwise been played such that the degraded video data is not visible on the display of the consuming client device.

2. The method of claim 1, wherein sending comprises sending the instruction to the consuming client device to cause the consuming client device to mask the degraded video data in the first format with video data played by the native media player in the second format.

3. The method of claim 1, wherein sending comprises sending the instruction to the consuming client device to cause the consuming client device to overlay the video data in the second format played by the native media player on the degraded video data in the first format at the portion of the display.

4. The method of claim 1, wherein sending comprises sending the instruction to the consuming client device to cause the consuming client device to play encoded video in the second format, in native quality, on the native media player.

5. The method of claim 1, further comprising sending a message to the consuming client device to instruct the consuming client device to edit out the degraded video data in the first format from the display.

6. The method of claim 1, wherein sending comprises sending the instruction to the consuming client device to cause the consuming client device to erase the degraded video data in the first format.

7. The method of claim 1, further comprising sending an indication to the sharing client device to instruct the sharing client device to omit sending subsequent video data in the first format to the consuming client device with the degraded video data.

8. An apparatus comprising:
   a network connection unit; and
   a processor coupled to the network connection unit, and configured to:
   identify an attempt by a sharing client device to share display data being displayed on at least a portion of a display of the sharing client device with one or more consuming client devices participating in a virtual meeting session with the sharing client device, the display data including video data and having a first format comprising a series of screen captures;
   receive from a consuming client device participating in the virtual meeting session video coordination data including playback quality information of the video data in the first format;
   automatically determine from the video coordination data that playback quality of the video data in the first format at the consuming client device is degraded; and
   in response to determining that the playback quality of the video data in the first format is degraded, automatically send from the server device to the consuming client device an instruction to launch a media player native to the consuming client device, the instruction causing the media player on the consuming client device to play the video data in a second format, supplied by the sharing client device and that is compatible with the native media player, at a portion of a display of the consuming client device at which the degraded video data in the first format would have otherwise been played such that the degraded video data is not visible on the display of the consuming client device.

9. The apparatus of claim 8, wherein the processor is further configured to send the instruction to the consuming client device to cause the consuming client device to mask the degraded video data in the first format with video data played by the native media player in the second format.

10. The apparatus of claim 8, wherein the processor is further configured to send the instruction to the consuming client device to cause the consuming client device to overlay the video data in the second format played by the native media player on the degraded video data in the first format at the portion of the display.

11. The apparatus of claim 8, wherein the processor is further configured to send the instruction to the consuming client device to cause the consuming client device to play encoded video in the second format, in native quality, on the native media player.

12. The apparatus of claim 8, wherein the processor is further configured to send a message to the consuming client device to instruct the consuming client device to edit out the degraded video data in the first format from the display.

13. The apparatus of claim 8, wherein the processor is further configured to send the instruction to the consuming client device to cause the consuming client device to erase the degraded video data in the first format.

14. The apparatus of claim 8, wherein the processor is further configured to send an indication to the sharing client device to instruct the sharing client device to omit sending subsequent video data in the first format to the consuming client device with the degraded video data.

15. A system comprising:
a memory element storing data; and
a processor operable to execute instructions associated with the stored data and configured to:
identify an attempt by a sharing client device to share display data being displayed on at least a portion of a display of the sharing client device with one or more consuming client devices participating in a virtual meeting session with the sharing client device, the display data including video data and having a first format comprising a series of screen captures;
receive from a consuming client device participating in the virtual meeting session video coordination data including playback quality information of the video data in the first format;
automatically determine from the video coordination data that playback quality of the video data in the first format at the consuming client device is degraded; and
in response to determining that the playback quality of the video data in the first format is degraded, automatically send from the server device to the consuming client device an instruction to launch a media player native to the consuming client device, the instruction causing the media player on the consuming client device to play the video data in a second format, supplied by the sharing client device and that is compatible with the native media player, at a portion of a display of the consuming client device at which the degraded video data in the first format would have otherwise been played such that the degraded video data is not visible on the display of the consuming client device.

16. The system of claim 15, wherein the processor is further configured to send the instruction to the consuming client device to cause the consuming client device to mask the degraded video data in the first format with video data played by the native media player in the second format.

17. The system of claim 15, wherein the processor is further configured to send the instruction to the consuming client device to cause the consuming client device to overlay the video data in the second format played by the native media player on the degraded video data in the first format at the portion of the display.

18. The system of claim 15, wherein the processor is further configured to send the instruction to the consuming client device to cause the consuming client device to play encoded video in the second format, in native quality, on the native media player.

19. The system of claim 15, wherein the processor is further configured to send a message to the consuming client device to instruct the consuming client device to edit out the degraded video data in the first format from the display.

20. The system of claim 15, wherein the processor is further configured to send the instruction to the consuming client device to cause the consuming client device to erase the degraded video data in the first format.

* * * * *